Nov. 2, 1943.  G. A. CLEMENT  2,333,362
BIFOCAL LENS BLANK
Filed April 1, 1942

INVENTOR
GEORGE A. CLEMENT.
BY
ATTORNEY

Patented Nov. 2, 1943

2,333,362

UNITED STATES PATENT OFFICE 2,333,362

BIFOCAL LENS BLANK

George A. Clement, Mount Vernon, N. Y.

Application April 1, 1942, Serial No. 437,135

2 Claims. (Cl. 88—54)

This invention has particular reference to the marking of bifocal lens blanks to denote their individual additions. The powers of bifocal lenses are usually prescribed on the basis of the correction for distance; that is, the dioptric power of the distance lens portion is given and the power of the reading or near field is figured by determining the amount that has to be added to the power of the distance field, and that amount is given in the prescription and is known as the addition or added power.

The added power of a bifocal lens blank is predetermined and the transforming of the blank into a finished lens does not affect the added power. A given blank may perhaps be susceptible of selectively producing any one of several finished lenses, each one with a different power for distance vision, but the near power will be stronger than the distance power by the predetermined added power, irrespective of the prescription selected.

To enable the workman to identify the blanks and determine readily the one to choose for a given prescription, it is customary to mark the addition on the edge of every blank. This has usually been done by scratching the figures in the edge of the glass blank, for example 2.25, meaning two and one-quarter diopters addition.

The difficulty of writing in glass in this manner is manifest, with the result that frequently the writing is not legible. But a still greater shortcoming in this manner of marking arises from the fact that the successive steps in transforming the blank to a finished lens reduces the thickness of the blank and thus grinds off the top and bottom portions of the figures, oftentimes destroying their legibility.

The form of marking contemplated by this invention obviates this difficulty. Transverse lines either in the form of grooves or of raised ribs are provided on the edge of the blank, selected in number and arrangement to denote the addition. The lines denoting the integral units of dioptric power are on the left, and spaced therefrom to the right are lines denoting fractional units of one quarter diopter each. Two lines on the left therefore denote two diopters, and two lines on the right denote half a diopter.

Grinding down the blank merely shortens the lines but they remain easily and unmistakably discernible down to the condition of the finished lens ready for edging.

The embodiment chosen for illustration in the accompanying drawing will now be described.

Figs. 6 to 13, inclusive, are edge views of a set of eight blanks having the characteristic marking and comprising an example of all the blanks within a selected range of added powers, in this case from one diopter to 2.75 diopters.

The form of blank selected for illustration is of the fused bifocal type, but the invention is adaptable with other forms of bifocal blanks.

In the fused bifocal art the major blank of glass of lower index of refraction is molded usually into meniscus or flat form, and a countersink of predetermined curvature is ground and finished in one face, and a piece of glass of higher index of refraction, commonly termed the segment or button, is finished on one side and is fused into the countersink. The fused blank is either sold in that rough form, or is ground and finished in the factory to a selected base curve on the bifocal side, leaving to the one who fills the prescription the job of grinding and finishing the other side to the form which will satisfy the prescription.

Figure 1:
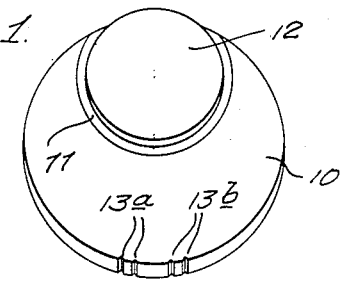
Fig. 1 is a perspective of a rough blank embodying the invention.
Figure 2:
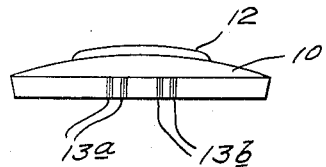
Fig. 2 is an edge view of the same.

Turning now to the drawing, Figs. 1 and 2 show the rough fused blank. The major blank 10 of meniscus form has a countersink 11 ground and polished in its upper face and a button 12 is fused in the countersink. In the edge are the identifying grooves in two spaced groups, the grooves 13a on the left denoting the units of dioptric power of addition, and the grooves 13b on the right denoting the fractions of dioptric power of addition. In this case, since there are two of each, the added power is 2.50 diopters.

Figure 3:
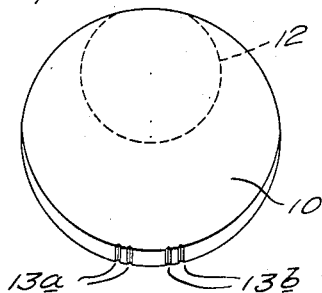
Fig. 3 is a view similar to Fig. 1 showing the blank in semi-finished condition.
Figure 4:
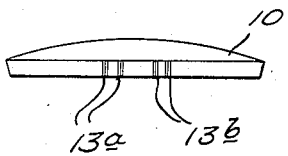
Fig. 4 is an edge view of the same.

In Figs. 3 and 4 the blank is shown in a further stage of treatment. It has been ground and finished on its bifocal side. As seen this somewhat reduces the thickness of the blank, but the lines 13a and 13b are nevertheless easily discernible.

Figure 5:
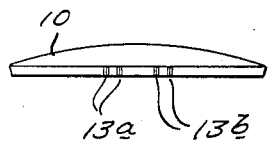
Fig. 5 is an edge view of the finished lens ready for edging.
Figure 6:
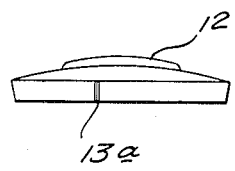
Figure 7:
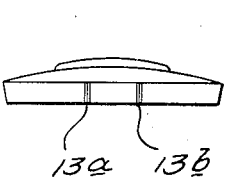
Figure 8:
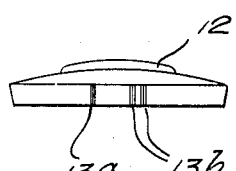
Figure 9:
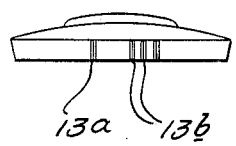
Figure 10:
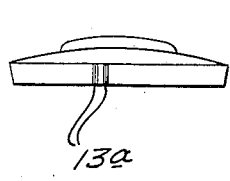
Figure 11:
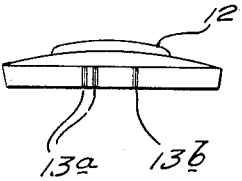
Figure 12:
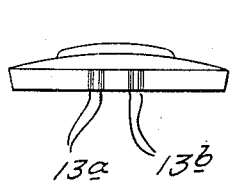
Figure 13:
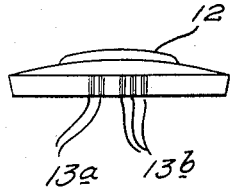

In Fig. 5 the blank is shown reduced to a finished lens ready for edging. This is done by grinding and polishing the opposite side to suit the prescription. This final treatment leaves the glass lens so thin that any writing on the lens would be practically obliterated. However the grooves are still unmistakable and may be easily detected with the thumb nail.

The product consisting of a complete set is shown in Figs. 6 to 13, inclusive. These are rough fused blanks with additions from one to 2.75 diopters with all the intermediate powers. This comprises all the usual additions. Obviously the same method of notation can be extended for special cases. Where the addition is but a fraction of a diopter any arbitrary mark may be employed to indicate that the whole units are zero.

The grooves may be readily ground into the edge with a proper grinding tool, in which case the letter X might be used to denote that the whole units are zero. Also of course the lines may be molded in the edge in which case they may be raised, if desired. However since the major blanks from a given mold may result in fused blanks of various powers of addition, it is preferable to mark the blanks after their addition has been determined.

It is obvious that the invention is equally applicable to one-piece bifocal blanks, and that other modifications will suggest themselves to those skilled in the art within the scope of the appended claims.

I claim:

1. A product in the manufacture of bifocal lenses comprising a set of bifocal lens blanks progressing from lowest to highest addition and having appreciable transverse lines indicative of the respective dioptric powers of addition formed upon their edges, there being one line for each integral unit of added dioptric power and one line for each fractional unit of added dioptric power, the lines of each denomination being grouped in immediate juxtaposition and the two groups being appreciably spaced.

2. A product in the manufacture of bifocal lenses comprising a set of bifocal lens blanks progressing from lowest to highest addition and each formed by fusing a small piece of glass of relatively high index of refraction into a countersink in one face of a major piece of glass of lower index of refraction, the blanks having transverse grooves in their edges forming lines indicative of their respective dioptric powers of addition, there being one line for each integral unit of added dioptric power and one line for each fractional unit of added dioptric power, the lines of each denomination being grouped in immediate juxtaposition and the two groups being appreciably spaced.

GEORGE A. CLEMENT.